United States Patent
Kumar et al.

(10) Patent No.: US 11,174,372 B2
(45) Date of Patent: Nov. 16, 2021

(54) HIGHLY-FILLED POLYURETHANE COMPOSITES WITH NON-SILANE TREATED GLASS FIBERS

(71) Applicant: BORAL IP HOLDINGS (AUSTRALIA) PTY LIMITED, North Sydney (AU)

(72) Inventors: Amitabha Kumar, San Antonio, TX (US); Li Ai, San Antonio, TX (US); Russell Hill, San Antonio, TX (US); Cassandra Hill, San Antonio, TX (US)

(73) Assignee: BORAL IP HOLDINGS (AUSTRALIA) PTY LIMITED, North Sydney (AU)

( * ) Notice: Subject to any disclaimer, the term of this patent is extended or adjusted under 35 U.S.C. 154(b) by 42 days.

(21) Appl. No.: 16/490,973

(22) PCT Filed: Mar. 13, 2017

(86) PCT No.: PCT/US2017/022052
§ 371 (c)(1),
(2) Date: Sep. 4, 2019

(87) PCT Pub. No.: WO2018/169508
PCT Pub. Date: Sep. 20, 2018

(65) Prior Publication Data
US 2020/0010647 A1    Jan. 9, 2020

(51) Int. Cl.
*C08K 13/06* (2006.01)
*C08K 3/36* (2006.01)
(Continued)

(52) U.S. Cl.
CPC .......... *C08K 13/06* (2013.01); *C08G 18/7671* (2013.01); *C08K 3/36* (2013.01);
(Continued)

(58) Field of Classification Search
None
See application file for complete search history.

(56) References Cited

U.S. PATENT DOCUMENTS

| | | |
|---|---|---|
| 3,236,895 A | 2/1966 | Lee et al. |
| 4,168,345 A | 9/1979 | de Massey et al. |
| (Continued) | | |

FOREIGN PATENT DOCUMENTS

| | | |
|---|---|---|
| AU | 2010282395 A1 | 3/2012 |
| KR | 2013110258 A | 10/2013 |
| (Continued) | | |

OTHER PUBLICATIONS

International Search Report in PCT/US2017/022052, dated Dec. 11, 2017 (8 pages).

*Primary Examiner* — Peter A Salamon
(74) *Attorney, Agent, or Firm* — Bookoff McAndrews, PLLC

(57) ABSTRACT

Polyurethane composites comprising non-silane treated glass fibers and methods of manufacturing are described herein. The polyurethane composites can include (a) a polyurethane formed by the reaction of (i) one or more isocyanates selected from the group consisting of diisocyanates, polyisocyanates, and mixtures thereof, and (ii) one or more polyols; (b) a filler; and (c) non-silane treated glass fibers. In some instances, none of the glass fibers in the polyurethane composites are silane treated. The polyurethane composites comprising the non-silane treated glass fibers can have a flexural strength that is greater than the flexural strength of an identical composition wherein the non-silane treated glass fibers are replaced with silane-treated glass fibers. Articles comprising the polyurethane composites are also disclosed herein.

16 Claims, 1 Drawing Sheet

(51) Int. Cl.
*C08K 3/40* (2006.01)
*C08K 7/14* (2006.01)
*C08K 9/04* (2006.01)
*C08K 9/06* (2006.01)
*C08G 18/76* (2006.01)

(52) U.S. Cl.
CPC .................. *C08K 3/40* (2013.01); *C08K 7/14* (2013.01); *C08K 9/04* (2013.01); *C08K 9/06* (2013.01); *C08K 2201/003* (2013.01); *C08K 2201/004* (2013.01)

(56) References Cited

U.S. PATENT DOCUMENTS

| | | |
|---|---|---|
| 4,883,826 A | 11/1989 | Marugg et al. |
| 5,334,639 A | 8/1994 | Rice |
| 5,393,335 A * | 2/1995 | Puckett ................. C03C 25/321 106/18 |
| 8,846,776 B2 | 9/2014 | Herrington et al. |
| 9,315,612 B2 | 4/2016 | Shutov |
| 2007/0036973 A1 | 2/2007 | Bruner et al. |
| 2010/0292397 A1 | 11/2010 | Brown |
| 2011/0086932 A1 | 4/2011 | Herrington |
| 2011/0086933 A1 * | 4/2011 | Herrington ............. C08L 75/04 521/170 |
| 2011/0086934 A1 * | 4/2011 | Herrington .......... C08K 11/005 521/172 |
| 2013/0023596 A1 | 1/2013 | Brown |
| 2020/0010647 A1 * | 1/2020 | Kumar ............... C08G 18/4208 |

FOREIGN PATENT DOCUMENTS

| | | |
|---|---|---|
| WO | WO 2007/112104 A2 | 10/2007 |
| WO | WO 2016/118141 A1 | 7/2016 |
| WO | WO 2017/180154 A1 | 10/2017 |

* cited by examiner

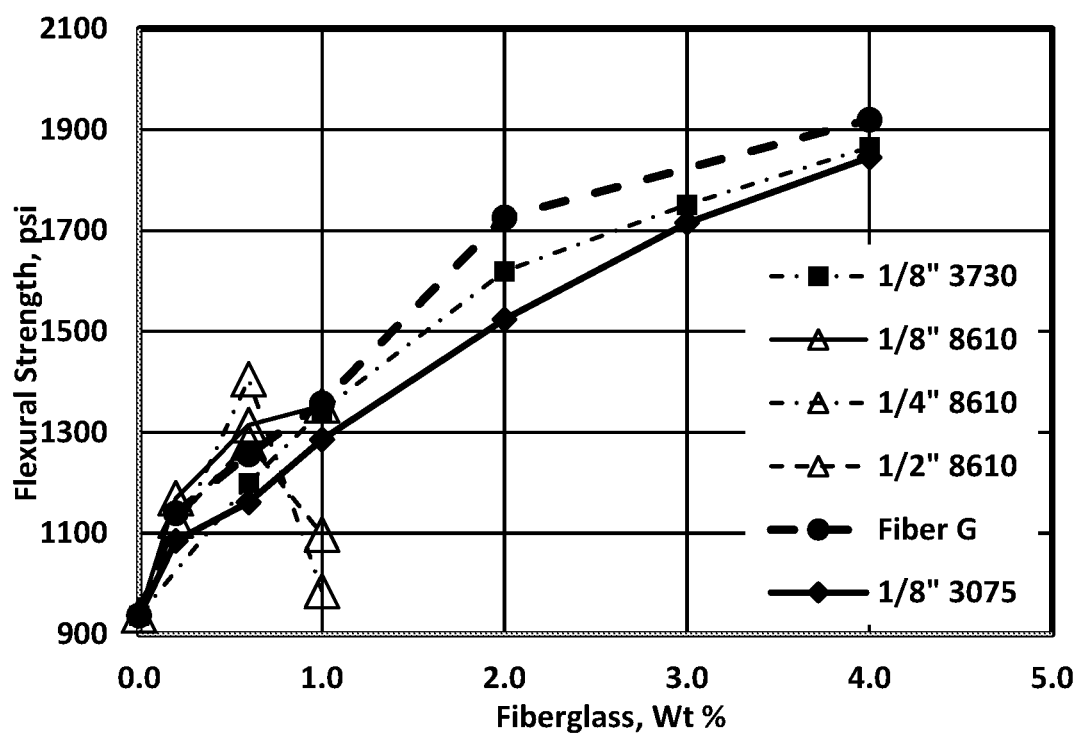

HIGHLY-FILLED POLYURETHANE COMPOSITES WITH NON-SILANE TREATED GLASS FIBERS

This application is a U.S. national stage filing under 35 U.S.C. § 371 of International Patent Application No. PCT/US2017/022052, filed on Mar. 13, 2017.

FIELD OF THE DISCLOSURE

This disclosure relates generally to polyurethane composites, more particularly, to the use of glass fibers that do not include a silane treatment in polyurethane composites.

BACKGROUND OF THE DISCLOSURE

Polymeric composites that contain organic and inorganic filler materials have become desirable for a variety of uses because of their excellent mechanical properties and weathering stability. In general, the superior properties of the organic-inorganic composites are achieved through use of the organic material as a matrix that acts as a glue with enhanced flexural properties or as a fibrous component providing reinforcement and improved tensile properties. The inorganic material imparts various properties of rigidity, toughness, hardness, optical appearance, interaction with electromagnetic radiation, density, and many other physical and chemical attributes. Notably, a proper blend of inorganic and organic components provides for a material with optimal properties at an optimal cost. However, one challenge is to obtain the required properties for particular applications at a minimum cost.

The use of polyurethane composites comprising a polyurethane binder, fly ash filler, and a glass fiber reinforcement have been shown to be useful in building materials. However, as the glass fiber content increases in the polyurethane composites, the fibers are not effectively debundled and may be present as large strands having a variety of states (including as individual fibers, strands, or clusters) in the final product. This reduces the number of effective individual fibers available for reinforcement. In addition, the incomplete debundling of glass fibers and the presence of a large variety of fiber states can lead to non-uniform distribution of the fibers in the composites. Consequently, increases in variation of desired properties in the final product may result, the reinforcing efficiency of the glass fibers can be greatly affected, and the possibility of getting internal and external holes, voids, and defects becomes much higher. The compositions and methods described herein address these and other needs.

SUMMARY OF THE DISCLOSURE

Polyurethane composites comprising non-silane treated glass fibers and methods of manufacturing are described herein. In some embodiments, the polyurethane composites can include (a) a polyurethane formed by the reaction of (i) one or more isocyanates selected from the group consisting of diisocyanates, polyisocyanates, and mixtures thereof, and (ii) one or more polyols; (b) from greater than 50% to 90% by weight, based on the total weight of the composite, of a filler; and (c) from 0.1% to 20% by weight, based on the total weight of the composite, of glass fibers, wherein at least a portion of the glass fibers in the polyurethane composites do not comprise a silane sizing agent. In some instances, none of the glass fibers in the polyurethane composites include a silane sizing agent.

The amount of polyurethane in the polyurethane composites can be from 15% to 60% by weight, for example, from 20% to 40% by weight, based on the total weight of the polyurethane composite. As described herein, the polyurethane composites can include a filler. The filler can include a particulate filler. The particulate filler can include coal ash such as fly ash. The amount of particulate filler in the polyurethane composites can be from 50% to 80% by weight, based on the total weight of the polyurethane composite.

The polyurethane composites also comprise non-silane treated glass fibers, as described above. In some embodiments, the non-silane treated glass fibers can be coated with a non-silane sizing agent such as a film former, a lubricant, a surfactant, or a combination thereof. For example, the non-silane treated glass fibers can be coated with a sizing agent such as a starch-oil sizing agent. The amount of non-silane treated glass fibers present in the polyurethane composites can be from 0.1% to 20%, such as from 0.2% to 10%, from 0.25% to 8%, from 0.25% to 6%, from 0.5% to 6%, or from 0.5% to 5% by weight, by weight, based on the total weight of the polyurethane composite. The glass fibers used in the composites can include chopped glass fibers. In some embodiments, the glass fibers can have an average length of 1 mm or greater. For example, the glass fibers can have an average length of from 1.5 mm to 33 mm or from 1.5 mm to 15 mm. The average diameter of the glass fibers can be from 5 to 55 microns. Suitable non-silane treated glass fibers for use in the composites can include E-glass fibers.

The density of the polyurethane composites can be 5 lb/ft$^3$ or greater. In some embodiments, the density of the polyurethane composites can be from 5 lb/ft$^3$ to 75 lb/ft$^3$, from 10 lb/ft$^3$ to 65 lb/ft$^3$, from 25 lb/ft$^3$ to 75 lb/ft$^3$, or from 25 lb/ft$^3$ to 65 lb/ft$^3$. In some examples, the polyurethane composites are foamed.

The polyurethane composites described herein can have a flexural strength that is 5% or greater than the flexural strength of an identical composition wherein the non-silane treated glass fibers are replaced with silane-treated glass fibers. For example, the flexural strength of the polyurethane composites can be from 5% to 25% greater than the flexural strength of an identical composition wherein the non-silane treated glass fibers are replaced with silane-treated glass fibers. In some embodiments, the polyurethane composites can have a flexural strength of 200 psi or greater, as measured by ASTM C1185. In some examples, the polyurethane composites can have a flexural strength of 1,000 psi or greater, such as from 1,000 to 2,500, as measured by ASTM C1185.

The normalized flexural strength (that is, the ratio of flexural strength in psi to density in pcf) of the polyurethane composites can be from 15 to 60, such as from 30 to 60. The ratio of flexural strength in psi to the percentage of glass fibers by weight in the polyurethane composites can be from 300 to 6000, such as from 500 to 1500.

In certain embodiments, the polyurethane composites described herein can include (a) from 20% to 40% by weight, based on the total weight of the composite, of a polyurethane formed by the reaction of (i) one or more isocyanates selected from the group consisting of diisocyanates, polyisocyanates, and mixtures thereof, and (ii) one or more polyols; (b) from greater than 50% to 90% by weight, based on the total weight of the composite, of fly ash; and (c) from 0.1% to 20% by weight, based on the total weight of the composite, of non-silane treated glass fibers, wherein the composite has a density of from 5 lb/ft$^3$ to 75 lb/ft$^3$, and wherein the composite has a flexural strength that is 5% or greater than the flexural strength of an identical composition wherein the glass fibers are replaced with silane-treated glass fibers. In some embodiments, the composites do not include silane-treated glass fibers.

Articles comprising the polyurethane composites are also disclosed. In some embodiments, the articles can include building products such as sidings, carpet backings, building panels, sheets, architectural moldings, sound barriers, thermal barriers, insulations, wall boards, ceiling tiles, ceiling boards, soffits, or roofing materials.

Methods of making the polyurethane composites are also described herein. The method can include mixing the one or more isocyanates selected from the group consisting of diisocyanates, polyisocyanates, and mixtures thereof, the one or more polyols, the filler, and the non-silane treated glass fibers to produce a mixture. The mixture may further comprise a catalyst. In some embodiments, the mixture can have an average initial viscosity of from 5,000 to 50,000 cps at 20° C. The method of making the polyurethane composites can include allowing the mixture to react and expand to form the polyurethane composite. In some embodiments, the polyurethane mixture can be formed in a mold. In some embodiments, the mixture can be allowed to rise freely during foaming in the mold.

DESCRIPTION OF THE DRAWINGS

FIG. 1 is a line graph showing the variation of flexural strength (psi) of polyurethane composites comprising silane treated or non-silane treated glass fibers. The mixtures used to form the polyurethane composites comprised 23% polyurethane by weight, the stated amounts by weight of glass fibers, and the balance fly ash.

DETAILED DESCRIPTION

Filled polyurethane composites comprising non-silane treated glass fibers and methods of preparing the composites are described herein. Non-silane treated glass fibers, with or without a non-silane surface sizing treatment, have a surface that is easier to distribute in filled polyurethane composites compared to silane-treated glass fibers. Therefore, non-silane treated glass fibers can be more effectively debundled into individual fibers during manufacture of the composites, thus increasing the number of effective glass fiber strands present. As the reinforcing efficiency of glass fibers is associated with the number of effective glass fiber stands, the use of non-silane treated glass fibers can significantly improve the mechanical properties of a filled polyurethane system. In some embodiments, the mechanical strength of polyurethane composites comprising non-silane treated glass fibers can be improved compared to composites having the same level of silane-treated glass fibers. Further, the non-silane treated glass fibers are more homogeneously distributed in polyurethane composites as individual fibers having similar length, orientation, and bundling, compared to composites with silane-treated glass fibers. As a result, polyurethane composite products can have less variation in properties such as density and flexural strength, due to uniform distribution of the non-silane treated glass fibers. Consequently, the aesthetics of polyurethane composite products can be improved and the cost of materials may be reduced.

In addition to the non-silane treated glass fibers, the polyurethane composites described herein can also comprise polyurethane formed using reactive systems such as reactive isocyanates and reactive polyols. In some embodiments, the composites can be formed using highly reactive systems including highly reactive polyols, highly reactive isocyanates, or both. Isocyanates suitable for use in the polyurethane composites can include one or more monomeric or oligomeric poly- or di-isocyanates. The monomeric or oligomeric poly- or di-isocyanate may include aromatic diisocyanates and polyisocyanates. The isocyanates can also be blocked isocyanates or pre-polymer isocyanates. The particular isocyanate used in the composites can be selected based on the desired properties of the composites, such as the amount of foaming, strength of bonding to the filler, wetting of the inorganic particulates in the reaction mixture, strength of the resulting composite, stiffness (elastic modulus), reactivity, and viscosity of the mixture.

An example of a useful diisocyanate is methylene diphenyl diisocyanate (MDI). Suitable MDI's include MDI monomers, MDI oligomers, and mixtures thereof. Further examples of useful isocyanates include those having NCO (i.e., the reactive group of an isocyanate) contents ranging from about 25% to about 35% by weight. Examples of useful isocyanates are found, for example, in *Polyurethane Handbook: Chemistry, Raw Materials, Processing Application, Properties*, 2$^{nd}$ Edition, Ed: Gunter Oertel; Hanser/Gardner Publications, Inc., Cincinnati, Ohio, which is herein incorporated by reference. Suitable examples of aromatic polyisocyanates include 2,4- or 2,6-toluene diisocyanate, including mixtures thereof p-phenylene diisocyanate; tetramethylene and hexamethylene diisocyanates; 4,4-dicyclohexylmethane diisocyanate; isophorone diisocyanate; 4,4-phenylmethane diisocyanate; polymethylene polyphenylisocyanate; and mixtures thereof. In addition, triisocyanates may be used, for example, 4,4,4-triphenylmethane triisocyanate; 1,2,4-benzene triisocyanate; polymethylene polyphenyl polyisocyanate; methylene polyphenyl polyisocyanate; and mixtures thereof. Suitable blocked isocyanates are formed by the treatment of the isocyanates described herein with a blocking agent (e.g., diethyl malonate, 3,5-dimethylpyrazole, methylethylketoxime, and caprolactam). Isocyanates are commercially available, for example, from Bayer Corporation (Pittsburgh, Pa.) under the trademarks MONDUR and DESMODUR. Other examples of suitable isocyanates include MONDUR MR Light (Bayer Corporation; Pittsburgh, Pa.), PAPI 27 (Dow Chemical Company; Midland, Mich.), Lupranate M20 (BASF Corporation; Florham Park, N.J.), Lupranate M70L (BASF Corporation; Florham Park, N.J.), Rubinate M (Huntsman Polyurethanes; Geismar, La.), Econate 31 (Ecopur Industries), and derivatives thereof. In some embodiments, the isocyanate compositions used to form the polyurethane composites can include those having viscosities ranging from 25 to 700 cPs at 25° C.

The average functionality of isocyanates useful with the polyurethane composites described herein can be from 1.5 to 5. Further, examples of useful isocyanates include isocyanates with an average functionality of from 2 to 4.5, from 2.2 to 4, from 2.4 to 3.7, from 2.6 to 3.4, or from 2.8 to 3.2.

As indicated herein, the polyurethane composites can include one or more polyols. The one or more polyols for use in the polyurethane composites can include polyester polyols, polyether polyols, Mannich polyols, or combinations thereof. In some embodiments, the one or more polyols can include a first polyol and/or a second polyol as described herein.

The one or more polyols can include one or more less reactive (or first) polyols. The less reactive polyol can have lower numbers of primary hydroxyl groups, lower primary hydroxyl numbers, and higher numbers of secondary hydroxyl groups, than a highly reactive polyol. As used herein, the primary hydroxyl number is defined as the hydroxyl number multiplied by the percentage of primary hydroxyl groups based on the total number of hydroxyl groups in the polyol. The one or more less reactive polyols can have about 40% or less primary hydroxyl groups, about 35% or less primary hydroxyl groups, about 30% or less primary hydroxyl groups, about 25% or less primary hydroxyl groups, about 20% or less primary hydroxyl groups, about 15% or less primary hydroxyl groups, or even about 10% or less primary hydroxyl groups. The one or more less reactive polyols can have primary hydroxyl numbers (as measured in units of mg KOH/g) of less than about 220, less than about 200, less than about 180, less than about 160, less than about 140, less than about 120, less than about 100, less than about 80, less than about 60, less than about 40, or even less than about 20. The number of primary hydroxyl groups can be determined using fluorine NMR spectroscopy as described in ASTM D4273.

The one or more less reactive polyols can have hydroxyl numbers (as measured in units of mg KOH/g) of 700 or less, 650 or less, 600 or less, 550 or less, 500 or less, 450 or less, 400 or less, 350 or less, 300 or less, 250 or less, 200 or less, 150 or less, 125 or less, 100 or less, 80 or less, 60 or less, 40 or less, or even 20 or less. The one or more less reactive polyols can have hydroxyl numbers (as measured in units of mg KOH/g) of 50 or more, 100 or more, 150 or more, 200 or more, 250 or more, 300 or more, 350 or more, 400 or more, 450 or more, or 500 or more. In some embodiments, the average hydroxyl number can be 700 or less, 650 or less, 600 or less, 550 or less, 500 or less, 450 or less, 400 or less, 350 or less, 300 or less, or 250 or less, and/or is 100 or more, 150 or more, 200 or more, 250 or more, 300 or more, 350 or more, 400 or more, 450 or more, or 500 or more. For example, the average hydroxyl number can be from 100 to 700, from 100 to 500, from 150 to 450, or from 200 to 400. In some embodiments, the one or more less reactive polyols can include two or more polyols. For example, there can be a blend of 75% of a polyol having a hydroxyl number of 400 and 25% of a polyol having a hydroxyl number of 100 to produce an average hydroxyl number of 325.

The functionality of the one or more less reactive polyols useful with the polyurethane composites described herein can be 4 or less, 3.5 or less, 3.25 or less, 3 or less, 2.75 or less, 2.5 or less, or 2.25 or less. In some embodiments, the functionality of the one or more less reactive polyols can be 2 or greater, 2.25 or greater, 2.5 or greater, 2.75 or greater, 3 or greater, 3.25 or greater, 3.5 or greater, or 3.75 or greater. The average functionality of the one or more less reactive polyols useful with the composites described herein can be 4 or less, 3.5 or less, 3.25 or less, 3 or less, 2.75 or less, 2.5 or less, or 2.25 or less. In some embodiments, the average functionality of the one or more less reactive polyols can be 2 or greater, 2.25 or greater, 2.5 or greater, 2.75 or greater, 3 or greater, 3.25 or greater, 3.5 or greater, or 3.75 or greater. Further, examples of useful less reactive polyols include polyols with an average functionality of from 2 to 4, from 2.5 to 4, or from 2 to 3.5.

The one or more less reactive polyols can have an average molecular weight of 250 g/mol or greater (e.g., 300 g/mol or greater, 350 g/mol or greater, 400 g/mol or greater, 450 g/mol or greater, 500 g/mol or greater, 550 g/mol or greater, 600 g/mol or greater, 650 g/mol or greater, or 700 g/mol or greater). In some cases, the one or more less reactive polyols have an average molecular weight of 700 g/mol or less (e.g., 650 g/mol or less, 600 g/mol or less, 550 g/mol or less, 500 g/mol or less, 450 g/mol or less, 400 g/mol or less, 350 g/mol or less, or 300 g/mol or less). In some cases, the one or more less reactive polyols have an average molecular weight of from 250 g/mol to 750 g/mol, from 250 g/mol to 600 g/mol, or from 250 g/mol to 500 g/mol.

The one or more less reactive polyols can include an aromatic polyester polyol, an aromatic polyether polyol, or a combination thereof. The aromatic polyol can have an aromaticity of 50% or less, such as 45% or less, or 40% or less. In some embodiments, the aromatic polyol can have an aromaticity of 35% or greater, such as 38% or greater, 40% or greater, or 45% or greater. In some examples, the one or more less reactive polyols include an aromatic polyester polyol such as those sold under the TEROL® trademark (e.g., TEROL® 198 and TEROL® 250). Other examples of less reactive polyols include a glycerin-based polyol and derivatives thereof commercially available from Carpenter Co. (e.g., Carpol® GP-240; Carpol® GP-725; Carpol® GP-700; Carpol® GP-1000; Carpol® GP-1500); polypropylene-based polyol and derivatives thereof commercially available from Huntsman International (e.g., Jeffol® FX31-240; Jeffol® G30-650; Jeffol® FX31-167; Jeffol® A-630; Jeffol® AD-310); polyester polyols available from Huntsman International (e.g., XO 13001); castor oil; Stepanpol PS-2052A (commercially available from the Stepan Company); Agrol 2.0, 3.6, 4.3, 5.6 and 7.0 (plant-based polyols commercially available from BioBased Technologies); Ecopol 123 and Ecopol 124, which are commercially available from Ecopur Industries; Honey Bee HB-150 and HB-230, soybean oil-based polyols commercially available from MCPU Polymer Engineering; Terol 1154, commercially available from Oxid (Houston, Tex.); Multranol 3900, Multranol 3901, Arcol 11-34, Arcol 24-32, Arcol 31-28, Arcol E-351, Arcol LHT-42, and Arcol LHT-112, commercially available from Bayer; and Voranol 220-028, 220-094, 220-110N, 222-056, 232-027, 232-034, and 232-035, commercially available from Dow Chemical Company.

The one or more less reactive polyols can be present in an amount of greater than 10%, greater than 20%, greater than 30%, greater than 40%, greater than 45%, greater than 50%, greater than 55%, greater than 60%, greater than 65%, greater than 70%, greater than 75%, greater than 80%, greater than 85%, greater than 90%, greater than 95%, or 100% by weight, based on the weight of the one or more polyols. In some embodiments, the one or more less reactive polyols can be present in an amount of 95% or less, 90% or less, 85% or less, 80% or less, 75% or less, 70% or less, 65% or less, 60% or less, 55% or less, 50% or less, 45% or less, 35% or less, 25% or less, or 20% or less, based on the weight of the one or more polyols.

The one or more polyols can include one or more highly reactive (or second) polyols. The one or more highly reactive polyols can include polyols having a large number of primary hydroxyl groups (e.g. 75% or more) based on the total number of hydroxyl groups in the polyol. For example, the high primary hydroxyl group polyols can include 80% or more, 85% or more, 90% or more, 95% or more, or 100% of primary hydroxyl groups. In some embodiments, the one or more highly reactive polyols can include polyols having a primary hydroxyl number of greater than 250. For example, the primary hydroxyl number can be greater than 300, greater than 320, greater than 340, greater than 360, greater than 380, greater than 400, greater than 420, greater than 460, greater than 465, or greater than 470.

The one or more highly reactive polyols can include polyols having a hydroxyl number of greater than 250. For example, the hydroxyl number can be greater than 275, greater than 300, greater than 325, greater than 350, greater than 375, greater than 400, greater than 425, greater than 450, greater than 475, greater than 500, greater than 525, greater than 550, greater than 575, greater than 600, greater than 625, greater than 650, greater than 675, greater than 700, greater than 725, or greater than 750.

The average functionality of the one or more highly reactive polyols useful with the polyurethane composites described herein can be 3.5 or greater, (e.g., 3.5 or greater, 3.6 or greater, 3.7 or greater, 3.8 or greater, 3.9 or greater, 4.0 or greater, 4.1 or greater, 4.2 or greater, 4.5 or greater, 5 or greater, or 6 or greater). In some embodiments, the average functionality of the one or more highly reactive polyols useful with the polyurethane composites can be 8 or less, (e.g., 7 or less, 6 or less, 5.5 or less, 5 or less, or 4.5 or less). Further, examples of useful one or more highly reactive polyols include polyols with an average functionality of from 3.5 to 8, from 3.5 to 7, from 3.5 to 6, from 3.5 to 5, or from 4 to 5.

In some cases, the one or more highly reactive polyols has a molecular weight of 350 g/mol or greater (e.g., 400 g/mol or greater, 450 g/mol or greater, 460 g/mol or greater, 470 g/mol or greater, 480 g/mol or greater, or 500 g/mol or greater). In some cases, the one or more highly reactive polyols has a molecular weight of 1000 g/mol or less (e.g., 900 g/mol or less, 800 g/mol or less, 700 g/mol or less, 600 g/mol or less, 550 g/mol or less, 540 g/mol or less, 530 g/mol or less, 520 g/mol or less, 500 g/mol or less, 480 g/mol or less, or 450 g/mol or less). In some cases, the one or more highly reactive polyols has a molecular weight of from 350 g/mol to 1000 g/mol or less, from 350 g/mol to 900 g/mol or less, from 400 g/mol to 800 g/mol or less, or from 400 g/mol to 700 g/mol or less.

In some embodiments, the one or more highly reactive polyols can include a Mannich polyol. Mannich polyols are the condensation product of a substituted or unsubstituted phenol, an alkanolamine, and formaldehyde. Mannich polyols can be prepared using methods known in the art. For example, Mannich polyols can be prepared by premixing the phenolic compound with a desired amount of the alkanolamine, and then slowly adding formaldehyde to the mixture at a temperature below the temperature of Novolak formation. At the end of the reaction, water is stripped from the reaction mixture to provide a Mannich base. See, for example, U.S. Pat. No. 4,883,826, which is incorporated herein by reference in its entirety. The Mannich base can then be alkoxylated to provide a Mannich polyol.

The substituted or unsubstituted phenol can include one or more phenolic hydroxyl groups. In certain embodiments, the substituted or unsubstituted phenol includes a single hydroxyl group bound to a carbon in an aromatic ring. The phenol can be substituted with substituents which do not undesirably react under the conditions of the Mannich condensation reaction, a subsequent alkoxylation reaction (if performed), or the preparation of polyurethanes from the final product. Examples of suitable substituents include alkyl (e.g., a $C_1$-$C_{18}$ alkyl, or a $C_1$-$C_{12}$ alkyl), aryl, alkoxy, phenoxy, halogen, and nitro groups.

Examples of suitable substituted or unsubstituted phenols that can be used to form Mannich polyols include phenol, o-, p-, or m-cresols, ethylphenol, nonylphenol, dodecylphenol, p-phenylphenol, various bisphenols including 2,2-bis(4-hydroxyphenyl)propane (bisphenol A), β-naphthol, β-hydroxyanthracene, p-chlorophenol, o-bromophenol, 2,6-dichlorophenol, p-nitrophenol, 4- or 2-nitro-6-phenylphenol, 2-nitro-6- or 4-methylphenol, 3,5-dimethylphenol, p-isopropylphenol, 2-bromo-6-cyclohexylphenol, and combinations thereof. In some embodiments, the Mannich polyol is derived from phenol or a monoalkyl phenols (e.g., a para-alkyl phenols). In some embodiments, the Mannich polyol is derived from a substituted or unsubstituted phenol selected from the group consisting of phenol, para-n-nonylphenol, and combinations thereof.

The alkanolamine used to produce the Mannich polyol can include a monoalkanolamine, a dialkanolamine, a trialkanolamine, a tetraalkanolamine, or combinations thereof. Examples of suitable monoalkanolamines include methylethanolamine, ethylethanolamine, methylisopropanolamine, ethylisopropanolamine, methyl-2-hydroxybutylamine, phenylethanolamine, ethanolamine, isopropanolamine, and combinations thereof. Suitable dialkanolamines include dialkanolamines which include two hydroxy-substituted $C_1$-$C_{12}$ alkyl groups (e.g., two hydroxy-substituted $C_1$-$C_8$ alkyl groups, or two hydroxy-substituted $C_1$-$C_6$ alkyl groups). The two hydroxy-substituted alkyl groups can be branched or linear, and can be of identical or different chemical composition. Examples of suitable dialkanolamines include diethanolamine, diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof. Suitable trialkanolamines include trialkanolamines which include three hydroxy-substituted $C_1$-$C_{12}$ alkyl groups (e.g., three hydroxy-substituted $C_1$-$C_8$ alkyl groups, or three hydroxy-substituted $C_1$-$C_6$ alkyl groups). The three hydroxy-substituted alkyl groups can be branched or linear, and can be of identical or different chemical composition. Examples of suitable trialkanolamines include triisopropanolamine (TIPA), triethanolamine, N,N-bis(2-hydroxyethyl)-N-(2-hydroxypropyl)amine (DEIPA), N,N-bis(2-hydroxypropyl)-N-(hydroxyethyl)amine (EDIPA), tris(2-hydroxybutyl)amine, hydroxyethyl di(hydroxypropyl)amine, hydroxypropyl di(hydroxyethyl)amine, tri(hydroxypropyl)amine, hydroxyethyl di(hydroxy-n-butyl)amine, hydroxybutyl di(hydroxypropyl)amine, and combinations thereof. Exemplary tetraalkanolamines include four hydroxy-substituted $C_1$-$C_{12}$ alkyl groups (e.g., four hydroxy-substituted $C_1$-$C_8$ alkyl groups, or four hydroxy-substituted $C_1$-$C_6$ alkyl groups). In certain embodiments, the alkanolamine is selected from the group consisting of diethanolamine, diisopropanolamine, and combinations thereof.

Any suitable alkylene oxide or combination of alkylene oxides can be used to form the Mannich polyol. In some embodiments, the alkylene oxide is selected from the group consisting of ethylene oxide, propylene oxide, butylene oxide, and combinations thereof. In certain embodiments, the Mannich polyol is alkoxylated with from 100% to about 80% propylene oxide and from 0 to about 20 wt % ethylene oxide.

Mannich polyols are known in the art, and include, for example, ethylene and propylene oxide-capped Mannich polyols sold under the trade names CARPOL® MX-425 and CARPOL® MX-470 (Carpenter Co., Richmond, Va.).

The one or more highly reactive polyols can be present in an amount of greater than 10%, greater than 20%, greater than 30%, greater than 40%, greater than 45%, greater than 50%, greater than 55%, greater than 60%, greater than 65%, greater than 70%, greater than 75%, greater than 80%, greater than 85%, greater than 90%, greater than 95%, or 100% by weight, based on the weight of the one or more polyols. In some embodiments, the one or more highly reactive polyols can be present in an amount of 95% or less, 90% or less, 85% or less, 80% or less, 75% or less, 70% or less, 65% or less, 60% or less, 55% or less, 50% or less, 45% or less, 35% or less, 25% or less, or 20% or less, based on the weight of the one or more polyols.

In some embodiments, the one or more polyols can include a sucrose and/or amine-based polyol. The sucrose and/or amine-based polyol can include, for example, a polyether polyol (including for example ethylene oxide, propylene oxide, butylene oxide, and combinations thereof) which is initiated by a sucrose and/or amine group. Sucrose and/or amine-based polyols are known in the art, and include, for example, sucrose/amine initiated polyether polyol sold under the trade name CARPOL® SPA-357 or CARPOL® SPA-530 (Carpenter Co., Richmond, Va.) and triethanol amine initiated polyether polyol sold under the trade name CARPOL® TEAP-265 (Carpenter Co., Richmond, Va.). The sucrose and/or amine-based polyol can be present in an amount of greater than 10%, greater than 20%, greater than 30%, greater than 40%, greater than 45%, greater than 50%, greater than 55%, greater than 60%, greater than 65%, greater than 70%, greater than 75%, greater than 80%, greater than 85%, greater than 90%, greater than 95%, or 100% by weight, based on the weight of the one or more polyols. In some embodiments, the sucrose and/or amine-based polyol can be present in an amount of 95% or less, 90% or less, 85% or less, 80% or less, 75% or less, 70% or less, 65% or less, 60% or less, 55% or less, 50% or less, 45% or less, 35% or less, 25% or less, or 20% or less, based on the weight of the one or more polyols.

Other suitable isocyanate-reactive monomers that can be used in the polyurethane composites include one or more polyamines. Suitable polyamines can correspond to the polyols described herein (for example, a polyester polyol or a polyether polyol), with the exception that the terminal hydroxy groups are converted to amino groups, for example by amination or by reacting the hydroxy groups with a diisocyanate and subsequently hydrolyzing the terminal isocyanate group to an amino group. By way of example, the polyamine can be polyether polyamine, such as polyoxyalkylene diamine or polyoxyalkylene triamine. Polyether polyamines are known in the art, and can be prepared by methods including those described in U.S. Pat. No. 3,236,895 to Lee and Winfrey. Exemplary polyoxyalkylene diamines are commercially available, for example, from Huntsman Corporation under the trade names Jeffamine® D-230, Jeffamine® D-400 and Jeffamine® D-2000. Exemplary polyoxyalkylene triamines are commercially available, for example, from Huntsman Corporation under the trade names Jeffamine® T-403, Jeffamine® T-3000, and Jeffamine® T-5000.

In some embodiments, the one or more polyols can include an alkoxylated polyamine (i.e., alkylene oxide-capped polyamines) derived from a polyamine and an alkylene oxide. Alkoxylated polyamines can be formed by reacting a suitable polyamine with a desired number of moles of an alkylene oxide. Suitable polyamines include monomeric, oligomeric, and polymeric polyamines. In some cases, the polyamines has a molecular weight of less than 1000 g/mol (e.g., less than 800 g/mol, less than 750 g/mol, less than 500 g/mol, less than 250 g/mol, or less than 200 less than 200 g/mol). Examples of suitable polyamines that can be used to form alkoxylated polyamines include ethylenediamine, 1,3-diaminopropane, putrescine, cadaverine, hexamethylenediamine, 1,2-diaminopropane, o-phenylenediamine, m-phenylenediamine, p-phenylenediamine, spermidine, spermine, norspermidine, toluene diamine, 1,2-propane-diamine, diethylenetriamine, triethylenetetramine, tetraethylene-pentamine (TEPA), pentaethylenehexamine (PEHA), and combinations thereof. Any suitable alkylene oxide or combination of alkylene oxides can be used to cap the polyamine. In some embodiments, the alkylene oxide is selected from the group consisting of ethylene oxide, propylene oxide, butylene oxide, and combinations thereof. Alkylene oxide-capped polyamines are known in the art, and include, for example, propylene oxide-capped ethylene diamine sold under the trade name CARPOL® EDAP-770 (Carpenter Co., Richmond, Va.) and ethylene and propylene oxide-capped ethylene diamine sold under the trade name CARPOL® EDAP-800 (Carpenter Co., Richmond, Va.).

The polyamines or alkoxylated polyamines (when used) can be present in varying amounts relative the one or more polyols used to form the polyurethane composite. In some embodiments, the polyamines or alkoxylated polyamines can be present in an amount of 30% or less, 25% or less, 20% or less, 15% or less, 10% or less, or 5% or less by weight based on the weight of the one or more polyols.

In certain cases, the polyurethane composites can include at least two polyols. For example, the polyurethane composites can be produced from one or more less reactive polyols and one or more highly reactive polyols. In some embodiments, the at least two polyols can include 50% or more of the first (less reactive) polyol and 30% or less of the second (highly reactive) polyol. In some embodiments, the at least two polyols can include 50% or less of the first (less reactive) polyol and 30% or more of the second (highly reactive) polyol. The one or more polyols for use in the polyurethane composites can have an average functionality of 1.5 to 6.0, 1.5 to 5.0, 1.8 to 4.0, or 1.8 to 3.5. The average hydroxyl number values (as measured in units of mg KOH/g) for the one or more polyols can be from 20 to 600 such as from 20 to 100, 100 to 600, from 150 to 550, from 200 to 500, from 250 to 440, from 300 to 415, from 340 to 400.

As indicated herein, in the polyurethane composites, one or more isocyanates are reacted with the one or more polyols (and any additional isocyanate-reactive monomers) to produce the polyurethane formulation. In general, the ratio of isocyanate groups to the total isocyanate reactive groups, such as hydroxyl groups, water and amine groups, is in the range of about 0.5:1 to about 1.5:1, which when multiplied by 100 produces an isocyanate index between 50 and 150. Additionally, the isocyanate index can be from about 80 to about 120, from about 90 to about 120, from about 100 to about 115, or from about 105 to about 110. Polyisocyanurate composites can also be formed from the one or more isocyanates and the one or more polyols described herein. With regards to the polyisocyanurate formulation, the isocyanate index can be from 180 to 380, for example, from 180 to 350, from 200 to 350, or from 200 to 270. As used herein, an isocyanate may be selected to provide a reduced isocyanate index, which can be reduced without compromising the chemical or mechanical properties of the composite material.

One or more catalysts can be added to facilitate curing and can be used to control the curing time of the polyurethane matrix. Examples of useful catalysts include amine-containing catalysts (e.g., tertiary amines such as DABCO and tetramethylbutanediamine, and diethanolamine), tin-, mercury-, and bismuth-containing catalysts. In some embodiments, the catalyst includes a delayed-action tin catalyst. In some embodiments, 0.01 wt % to 2 wt % (e.g., 0.025 wt % to 1 wt %, 0.05 wt % to 0.5 wt %, or 0.1 wt % to 0.25 wt %) catalyst or catalyst system can be used based on the weight of the polyurethane. In some embodiments, 0.05 to 0.5 parts catalyst or catalyst system per hundred parts of polyol can be used.

The polyurethane can be present in the polyurethane composites in amounts from 10% to 60% by weight, based on the weight of polyurethane composite. For example, the polyurethane can be included in an amount from 14% to 60% or 20% to 50% by weight, based on the weight of the polyurethane composite. In some embodiments, the polyurethane can be present in an amount of 10% or greater, 15% or greater, 20% or greater, 25% or greater, 30% or greater, 35% or greater, 40% or greater, 45% or greater, 50% or greater, or 55% or greater by weight, based on the weight of the polyurethane composite. In some embodiments, the polyurethane can be present in an amount of 60% or less, 55% or less, 50% or less, 45% or less, 40% or less, 35% or less, 30% or less, 25% or less, 20% or less, or 15% or less by weight, based on weight of polyurethane composite.

The polyurethane composites can include a particulate filler and particularly an inorganic particulate filler. Suitable examples of particulate fillers can be an ash, ground/recycled glass (e.g., window or bottle glass); milled glass; glass spheres; glass flakes; activated carbon; calcium carbonate; aluminum trihydrate (ATH); silica; sand; ground sand; silica fume; slate dust; crusher fines; red mud; amorphous carbon (e.g., carbon black); clays (e.g., kaolin); mica; talc; wollastonite; alumina; feldspar; bentonite; quartz; garnet; saponite; beidellite; granite; slag; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; expanded clay; expanded shale; expanded perlite; vermiculite; volcanic tuff; pumice; hollow ceramic spheres; hollow plastic spheres; expanded plastic beads (e.g., polystyrene beads); ground tire rubber; and mixtures thereof.

The particulate filler can have a median particle size diameter of from 0.2 micron to 100 microns. For example, the particulate filler can have a median particle size diameter of 100 microns or less, 95 microns or less, 90 microns or less, 85 microns or less, 80 microns or less, 75 microns or less, 70 microns or less, 65 microns or less, 60 microns or less, 55 microns or less, 50 microns or less, 45 microns or less, 40 microns or less, 35 microns or less, 30 microns or less, 25 microns or less, or 20 microns or less. In some embodiments, the particulate filler can have a median particle size diameter of 0.2 microns or more, 0.3 microns or more, 0.4 microns or more, 0.5 microns or more, 0.7 microns or more, 1 micron or more, 2 microns or more, 5 microns or more, 10 microns or more, 15 microns or more, 20 microns or more, 25 microns or more, 30 microns or more, 35 microns or more, 40 microns or more, or 45 microns or more. In some examples, the particulate filler can have a median particle size diameter of from 0.2 microns to 100 microns, 0.2 microns to 90 microns, or 0.3 microns to 80 microns, 1 to 50 microns, 1 to 25 microns, or 5 to 15 microns.

In some embodiments, the particulate filler includes an ash. The ash can be a coal ash or another type of ash such as those produced by firing fuels including industrial gases, petroleum coke, petroleum products, municipal solid waste, paper sludge, wood, sawdust, refuse derived fuels, switchgrass or other biomass material. The coal ash can be fly ash, bottom ash, or combinations thereof. In some examples, the particulate filler includes fly ash. Fly ash is produced from the combustion of pulverized coal in electrical power generating plants. The fly ash useful with the composite materials described herein can be Class C fly ash, Class F fly ash, or a mixture thereof. Fly ash produced by coal-fueled power plants is suitable for incorporation in the composites described herein. In some embodiments, the particulate filler consists of or consists essentially of fly ash.

The fly ash can have a particle size distribution with at least two modes. For example, the particle size distribution of the fly ash can be three, four, five, or more modes. Alternatively, the fly ash can be blended with another fly ash to modify the properties of the fly ash to produce a fly ash having a particle size distribution with at least three modes.

In some embodiments, the fly ash can include a first mode having a median particle diameter of 2.0 microns or less. In some examples, the median particle size of the first mode can be 0.3 microns to 1.5 microns, 0.4 microns to 1 microns, or 0.5 microns to 0.8 microns (e.g., 0.7 microns). The fly ash can include a second mode having a median particle diameter of from 3 microns to less than 40 microns. In some examples, the median particle size of the second mode can be from 5 microns to 35 microns, 10 microns to 30 microns, or 10 microns to 25 microns. The fly ash can include a third mode having a median particle diameter of 40 microns or greater. In some examples, the median particle size of the third mode can be from 40 microns to less than 100 microns, for example from 40 microns to 90 microns, 40 microns to 80 microns, or from 40 microns to 75 microns. In some embodiments, the fly ash can include a first mode having a median particle diameter of from 0.3 microns to 1.0 micron, a second mode having a median particle diameter of from 10 microns to 25 microns, and a third mode having a median particle diameter of from 40 microns to 80 microns. In some examples, the fly ash can also include an additional ultrafine mode with a median particle diameter of from 0.05 microns to 0.2 microns. In some embodiments, the fly ash can have a median particle size diameter of 25 microns or less.

In some embodiments, the particle size distribution can include 11-35% of the particles by volume in the first mode, 65-89% of the particles by volume in the second mode. In some embodiments, the particle size distribution can include 11-17% of the particles by volume in the first mode, 56-74% of the particles by volume in the second mode, and 12-31% of the particles by volume in the third mode. The ratio of the volume of particles in the second mode to the volume of particles in the first mode can be from 4.5 to 7.5.

The particulate filler can be present in the polyurethane composites described herein in amounts from 20% to 90% by weight. Examples of the amount of particulate filler present in the polyurethane composite described herein include 20%, 25%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90% by weight. In some embodiments, the particulate filler, for example fly ash, can be present in amounts from 35% to 80% by weight such as from 50% to 80% by weight or from 50% to 75% by weight. In some embodiments, the particulate filler can include calcium carbonate and can be present from 20% to 70% by weight such as from 45% to 65% by weight. In some embodiments, the calcium carbonate can be limestone.

In some embodiments, the particulate filler can include fly ash and calcium carbonate. When used with fly ash, the amount of calcium carbonate in the polyurethane composites can be from 0.1% to 15% by weight, based on the weight of the polyurethane composites. In some embodiments, the polyurethane composites can include 15% or less, 14% or less, 12% or less, 10% or less, or 8% or less by weight calcium carbonate. In some embodiments, the polyurethane composites can include 0.1% or greater, 0.5% or greater, 1% or greater, 2% or greater, 3% or greater, or 5% or greater by weight calcium carbonate. In some embodiments, when used with fly ash, the polyurethane composites can include 1% to 15%, 1% to 10%, or 1% to 8% by weight calcium carbonate.

In some embodiments, the particulate filler can include an organic filler, such as a recycled polymeric material. Suitable examples include pulverized polymeric foam or recycled rubber material.

The composites described herein can include a plurality of glass fibers dispersed within the composite. The glass fibers can include fibrous glass such as E-glass, C-glass, S-glass, G-glass, and AR-glass fibers.

In general, a sizing agent operable to impart desired properties is typically applied to glass fibers subsequent to glass fiber formation. As used herein, the terms "sizing agent," "sizing composition," "sizing treatment," "sizing," or "size" refer to a coating composition applied to the fibers prior to, during, or after forming. In some embodiments, the sizing agent can include a film former, a lubricant, an emulsifier (surfactant), or a combination thereof. The sizing agent can also include other additives such as an antistat, a pH controller, a nucleating agent, or a combination thereof. Sizing agents may provide protection through subsequent processing steps, such as those where the fibers pass by contact points, drying the aqueous-based or solvent-based sizing composition to remove the water or solvent, chopping in a wet or dry condition, roving into larger bundles or groups of strands, unwinding for use as a reinforcement, and other downstream processes. Further, when placed on fibers that reinforce polymeric matrices in the production of composites and other products, the sizing agent can also provide compatibility between the fiber and the matrix polymer or resin.

The sizing agent typically used on glass fibers for composites is an organosilane such as glycidoxy-propyltrimethoxysilane. However, organosilane treated glass fibers can form aggregates at least partly due to non-covalent interactions between the organosilane groups. The viscosity of a filled polyurethane system is usually much higher than a non-filled system partly due to the formation of filler aggregates. In some cases, viscosity reduction of the filled system can be achieved by breaking up the aggregates, such as by applying a shear or other external force which may mechanically separate the aggregates. However, the efficiency of the separation depends on various factors such as the deformation rate.

At least a portion of the glass fibers used in the polyurethane composites are not silane treated. The glass fibers can include non-silane treated glass fibers that include a non-silane sizing agent. In some embodiments, the glass fibers used in the polyurethane composites described herein can include non-silane treated glass fibers, that is, the glass fibers include an agent that is not a silane surface treatment. "Silane" as used herein refers to a saturated chemical compound comprising one or multiple silicon atoms linked together in which each silicon atom forms a tetrahedral center. In some embodiments, the silane can have the formula $Si_nH_{2n+2}$. In other embodiments, the silane can include a heteroatom where the one or more silicon atoms are substituted with an atom other than hydrogen. For instance, the term "silane" can include organosilanes and siloxanes. In some examples, the silane can have the formula $(RO)_nSiX_{4-n}$, wherein RO is an alkoxy group (e.g., methoxy, ethoxy, propoxy, or butoxy) and X is an organofunctional group. In some embodiments, the non-silane treated glass fibers can be coated with a non-silane composition, for example, to modify their reactivity. In some embodiments, the non-silane composition may change the surface energy of the glass fibers so that the fiber-matrix interaction force overcomes the aggregation force.

In some embodiments, the non-silane treated glass fibers can be coated with a non-silane sizing agent. Suitable non-silane sizing agents for use in the composites can include aqueous sizing compositions for promoting dispersion of the glass fibers such as a film former, a lubricant, an emulsifier (surfactant), or a combination thereof. Suitable examples of film formers include epoxies, polyesters, polyvinyl alcohols, alkylene vinyl alcohols (e.g., ethylene vinyl alcohol), polyolefins, polyurethanes, or combinations thereof. Suitable examples of lubricants include imidazolines, tetraethylene amides, mineral oil, amide esters, acid amides, polyalkylene glycols (e.g., polyethylene glycols), or combinations thereof. Suitable examples of emulsifiers include polyoxyethylene nonylphenol ether, alkoxy (e.g., ethoxy/propoxy) condensate polyoxyethylene octylphenyl glycol ether, polysorbates (e.g., TWEEN), alkoxylated derivatives of sorbitol esters (e.g., TMAZ® 81), or combinations thereof.

In some examples, the non-silane sizing agents can include an oil, a polysaccharide, an organophosphorus acid, a derivative thereof, or a combination thereof. U.S. Pat. No. 5,334,639 to Rice and U.S. Pat. No. 5,393,335 to Puckett, for example, disclose suitable starch oil sizing compositions for coating fibers. U.S. Patent Application No. 2007/0036973 to Bruner et al., for example, discloses suitable organophosphorous sizing compositions for coating fibers. In some embodiments, the glass fibers in the polyurethane composites described herein can include a starch and an oil.

Examples of suitable starches include amylose-containing starches derived from any starch sources such as corn, wheat, potato, tapioca, waxy maize, sago, rice, hybrid starches, or a combination thereof. In some embodiments, the starch can be modified with, for example, an alkoxy group such as a propoxy group. The starch can be present in an amount of from 40% to 95% by weight, such as from 40% to 65% by weight of the sizing treatment. Examples of suitable oils include waxes and vegetable oils hydrogenated to various degrees, such as cotton seed oil, corn oil, soybean oil, or combinations thereof. The oil can be present in an amount of from 5% to 60% by weight, such as from 5% to 15% by weight of the sizing treatment. Suitable waxes known to those skilled in the art for treating the glass fibers can include paraffin wax, animal waxes, mineral waxes, petroleum derivative waxes, and synthetic waxes. The amount of wax can be in an amount of from 5% to 60% by weight, such as from 10% to 30% by weight of the sizing treatment. In some embodiments of the starch and oil sizing agent, the oil can include a mixture of partially hydrogenated soybean oil and paraffin wax. Suitable non-silane treated glass fibers include non-silane treated G glass and E glass fibers.

In some embodiments, at least a portion of the glass fibers described herein do not include a sizing agent. For example, in some embodiments, at least a portion of the glass fibers described herein are untreated.

As noted herein, at least a portion of the glass fibers in the polyurethane composites can include non-silane treated glass fibers. For example, 10% by weight or more, 20% by weight or more, 30% by weight or more, 40% by weight or more, 50% by weight or more, 60% by weight or more, 70% by weight or more, 80% by weight or more, or 90% by weight or more, of the glass fibers used in the polyurethane composites are non-silane treated glass fibers. In some embodiments, none of the glass fibers in the polyurethane composites are silane treated (i.e., all of the glass fibers are non-silane treated).

The following paragraphs discuss certain properties and amounts of glass fibers. However, these paragraphs can also be used to describe the properties and amounts of non-silane treated glass fibers. Thus, the size, length, and amount of glass fibers in the polyurethane composites described below can also be the size, length, and amount of non-silane treated glass fibers in the polyurethane composites.

The glass fibers in the polyurethane composites can be provided in the form of yarns, individual fibers, or chopped fibers. The polyurethane composites can include a plurality of glass fibers having an average length of 1 mm or greater, 1.5 mm or greater, 2 mm or greater, 3 mm or greater, 4 mm or greater, 5 mm or greater, or 6 mm or greater. In some embodiments, the average length of the glass fibers can be 50 mm or less, 40 mm or less, 30 mm or less, 20 mm or less, 15 mm or less, 12 mm or less, or 10 mm or less. In some examples, the glass fibers can be from 1 mm to 50 mm in average length. For example, the glass fibers can be from 1.5 mm to 30 mm, from 2 mm to 30 mm, from 3 mm to 30 mm, or from 3 mm to 15 mm in average length.

The glass fibers in the composites can have any dimension of from 1 $\mu$m to 30 $\mu$m in average diameter. For example, in some embodiments, the glass fibers can have an average diameter of 30 microns or less, 25 microns or less, 20 microns or less, 15 microns or less, 10 microns or less, or 5 microns or less. In some embodiments, the glass fibers can have an average diameter of 1 micron or more, 2 microns or more, 3 microns or more, 5 microns or more, 10 microns or more, 15 microns or more, 20 microns or more, 25 microns or more, or 30 microns or more. In some embodiments, the average diameter of the glass fibers can be 1.5 $\mu$m to 30 $\mu$m, 3 $\mu$m to 20 $\mu$m, 4 $\mu$m to 18 $\mu$m, or 5 $\mu$m to 15 $\mu$m. The glass fibers can be provided in the composite in a random orientation or can be axially oriented.

The glass fibers can be present in the polyurethane composites in any suitable amount to confer a desirable property to the composite. In some embodiments, the glass fibers can be present in the polyurethane composites in amounts of 0.1% or greater by weight, based on the weight of the composite. For example, the glass fibers can be present in the polyurethane composites in amounts of 0.25% or greater, 0.5% or greater, 1% or greater, 2.5% or greater, 5% or greater, 10% or greater, 12.5% or greater, or 15% or greater by weight, based on the weight of the composite. In certain embodiments, the glass fibers can be present in the polyurethane composites in amounts of 20% or less by weight, based on the weight of the composite. For example, the glass fibers can be present in the polyurethane composites in amounts of 15% or less, 12% or less, 10% or less, 8% or less, 7% or less, 6% or less, 5% or less, 4% or less, 3.5% or less, 3% or less, 2.5% or less, or 2% or less by weight, based on the total weight of the composite. In some embodiments, the glass fibers can be present in the composites in amounts from 0.1% to 20%, 0.25% to 20%, 0.5% to 20%, 1% to 20%, 0.1% to 15%, 0.25% to 15%, 0.5% to 15%, 1% to 15%, 0.1% to 10%, 0.25% to 10%, 0.5% to 10%, 1% to 10%, 0.1% to 8%, 0.1% to 6%, or 0.1% to 4% by weight, based on the total weight of the composite.

The polyurethane composites can include additional fiber materials. The additional fiber materials can include inorganic or organic fibers. Inorganic fibers suitable for use with the composites can include basalt fibers, alumina silica fibers, aluminum oxide fibers, silica fibers, carbon fibers, metal fibers, metal and metal-coated fibers, and mineral fibers (such as stone wool, slag wool, or ceramic fiber wool). In some examples, fire resistant or retardant glass fibers can be included to impart fire resistance or retarding properties to the polyurethane composites. Organic fibers suitable for use with the composites can include polyalkylene fibers, polyamide fibers, phenol-formaldehyde fibers, polyvinyl chloride fibers, polyacrylic fibers, polyester fibers, acrylic polyester fibers, polyurethane fibers, polyacrylonitrile fibers, rayon fibers, cellulose fibers, carbon fibers, or combinations thereof. In certain embodiments, the additional fiber materials can include hemp fibers, sisal fibers, cotton fibers, straw, reeds, or other grasses, jute, bagasse fibers, bamboo fibers, abaca fibers, flax, southern pine fibers, wood fibers, cellulose, saw dust, wood shavings, lint, vicose, leather fibers, rayon, and mixtures thereof. Other suitable additional fiber materials include synthetic fibers such as, Kevlar, viscose fibers, Dralon® fibers, polyethylene fibers, polyethylene naphthalate fibers, polypropylene fibers, polyvinyl alcohol fibers, aramid fibers, or combinations thereof. In some embodiments, the composites can include a combination of fibers that break and fibers that do not break when the polyurethane composites are being formed using processing machinery and/or fractured by external stress.

In some embodiments, the additional fiber materials and/or the particulate filler such as fly ash can be coated with a composition to modify their reactivity. For example, the additional fiber materials and/or the particulate filler can be coated with a sizing agent such as a coupling agent (compatibilizer). In some embodiments, the additional fiber materials and/or the particulate filler can be coated with a sizing agent. For example, in some embodiments the additional fiber materials and/or the particulate filler can be coated with a non-silane sizing agent.

Additional components useful with the polyurethane composites can include foaming agents, blowing agents, surfactants, chain-extenders, crosslinkers, UV stabilizers, fire retardants, antimicrobials, anti-oxidants, and pigments. Though the use of such components is well known to those of skill in the art, some of these additional additives are further described herein.

Chemical foaming agents include azodicarbonamides (e.g., Celogen manufactured by Lion Copolymer Geismar); and other materials that react at the reaction temperature to form gases such as carbon dioxide. In the case of polyurethane foam, water is an exemplary foaming agent that reacts with isocyanate to yield carbon dioxide. The presence of water as an added component or in the filler also can result in the formation of polyurea bonds through the reaction of the water and isocyanate. In some embodiments, water may be present in the mixture used to produce the polyurethane composites in an amount of from greater than 0% to 5% by weight or less, based on the weight of the mixture. In some embodiments, water can be present in a range of 0.02% to 4%, 0.05% to 3%, 0.1% to 2%, or 0.2% to 1% by weight, based on the weight of the mixture. In some embodiments, the mixture used to produce the composite includes less than 0.5% by weight water. In some embodiments, no chemical foaming agents are used. In some embodiments, water is the only foaming agent used.

Surfactants can be used as wetting agents and to assist in mixing and dispersing the materials in a composite. Surfactants can also stabilize and control the size of bubbles formed during the foaming event and the resultant cell structure. Surfactants can be used, for example, in amounts below about 0.5 wt % based on the total weight of the mixture. Examples of surfactants useful with the polyurethane composites described herein include anionic, non-ionic and cationic surfactants. For example, silicone surfactants such as Tegostab B-8870, DC-197 and DC-193 (Air Products; Allentown, Pa.) can be used.

Low molecular weight reactants such as chain-extenders and/or crosslinkers can be included in the polyurethane composites. These reactants can help the polyurethane composites to distribute and contain the fiber material and/or particulate filler within the composite. Chain-extenders are difunctional molecules, such as diols or diamines, which can polymerize to lengthen the urethane polymer chains. Examples of chain-extenders include ethylene glycol; 1,4-butanediol; ethylene diamine, 4,4'-methylenebis(2-chloroaniline) (MBOCA); diethyltoluene diamine (DETDA); and aromatic diamines such as Unilink 4200 (commercially available from UOP). Crosslinkers are tri- or greater functional molecules that can integrate into a polymer chain through two functionalities and provide one or more further functionalities (i.e., linkage sites) to crosslink to additional polymer chains. Examples of crosslinkers include glycerin, trimethylolpropane, sorbitol, diethanolamine, and triethanolamine. In some polyurethane composites, a crosslinker or chain-extender may be used to replace at least a portion of the one or more polyols in the polyurethane composites. For example, the polyurethane can be formed by the reaction of an isocyanate, a polyol, and a crosslinker.

Coupling agents and other surface treatments such as viscosity reducers, flow control agents, or dispersing agents can be added directly to the filler or fiber, or incorporated prior to, during, and/or after the mixing and reaction of the polyurethane composites. Coupling agents may also reduce the viscosity of the polyurethane composites mixture. Coupling agents can also allow higher filler loadings of the particulate filler such as fly ash, and/or fiber material, and may be used in small quantities. For example, the polyurethane composites may comprise about 0.01 wt % to about 0.5 wt % of a coupling agent. Examples of coupling agents useful with the polyurethane composites described herein include Ken-React LICA 38 and KEN-React KR 55 (Kenrich Petrochemicals; Bayonne, N.J.). Examples of dispersing agents useful with the polyurethane composites described herein include JEFFSPERSE X3202, JEFFSPERSE X3202RF, and JEFFSPERSE X3204 (Huntsman Polyurethanes; Geismar, La.).

Ultraviolet light stabilizers, such as UV absorbers, can be added to the polyurethane composites described herein. Examples of UV light stabilizers include hindered amine type stabilizers and opaque pigments like carbon black powder. Fire retardants can be included to increase the flame or fire resistance of the polyurethane composites. Antimicrobials can be used to limit the growth of mildew and other organisms on the surface of the composite. Antioxidants, such as phenolic antioxidants, can also be added. Antioxidants provide increased UV protection, as well as thermal oxidation protection.

Pigments or dyes can optionally be added to the polyurethane composites described herein. An example of a pigment is iron oxide, which can be added in amounts ranging from about 2 wt % to about 7 wt %, based on the total weight of the polyurethane composites.

A reinforcement can be included on one or more surfaces of the polyurethane composites described herein. Fiber reinforcements are described in PCT/US2016/027863, the disclosure of which is herein incorporated by reference in its entirety. In some embodiments, the polyurethane composite can include a first fiber reinforcement on a first surface of the composite. In some embodiments, the composites can include a first fiber reinforcement on a first surface of the polyurethane composite and a second fiber reinforcement on a second surface, opposite the first surface, of the polyurethane composite. The fiber reinforcement can include any of the fiber materials as described herein and can include a blend of different fibers (either type or size). In some embodiments, the fiber reinforcement can include glass fibers. The fiber reinforcement can be woven or non-woven. In some embodiments, the polyurethane composite can include a first fiber reinforcement on a first surface of the composite and a material, other than a fiber reinforcement, on a second surface of the composite. In some embodiments, the material can include a cementitious layer, a paper sheet, a metal sheet, a polymeric layer, or a combination thereof. Examples of such materials include an aluminum sheet, an aluminum-plated sheet, a zinc sheet, a zinc-plated sheet, an aluminum/zinc alloy sheet, an aluminum/zinc alloy-plated sheet, a stainless steel sheet, craft paper, a polymeric surfacing film, or a combination thereof. Further advantages of using a fiber reinforcement with the polyurethane composites described herein can also be realized.

The density of the polyurethane composites described herein can be 5 lb/ft$^3$ or greater. For example, the density of the polyurethane composite can be from 5 lb/ft$^3$ to 75 lb/ft$^3$, 10 lb/ft$^3$ to 75 lb/ft$^3$, from 25 lb/ft$^3$ to 75 lb/ft$^3$, from 40 lb/ft$^3$ to 75 lb/ft$^3$, from 45 lb/ft$^3$ to 70 lb/ft$^3$, from 10 lb/ft$^3$ to 65 lb/ft$^3$, from 25 lb/ft$^3$ to 65 lb/ft$^3$, from 10 lb/ft$^3$ to 60 lb/ft$^3$, from 35 lb/ft$^3$ to 50 lb/ft$^3$, from 35 lb/ft$^3$ to 60 lb/ft$^3$, from 5 lb/ft$^3$ to 30 lb/ft$^3$, from 10 lb/ft$^3$ to 35 lb/ft$^3$, from 15 lb/ft$^3$ to 35 lb/ft$^3$ or from 20 lb/ft$^3$ to 40 lb/ft$^3$. In some embodiments, the density of the polyurethane composite is at least 10 lb/ft$^3$.

Incorporation of the non-silane treated glass fibers in the polyurethane composites described herein can increase their mechanical strength, compared to identical composites with the non-silane treated glass fibers replaced with silane treated glass fibers. As discussed herein, non-covalent interactions and other interfiber surface interactions may prevent silane treated glass fibers from debundling when incorporated into filled composites. In contrast, glass fibers that do not include a silane treatment can exhibit improved dispersion and debundling in highly-filled polyurethane composites so that a larger number of individual fibers are present in the composite matrix. Further, dispersion and debundling of the non-silane treated glass fibers can also effect a more uniform and homogeneous dispersion of the glass fibers in the final product. The larger number of individual glass fibers available and the more homogeneous dispersion of these fibers can improve the reinforcing efficiency of non-silane treated glass fibers compared to silane treated glass fibers. Therefore, it possible to achieve the same level of composite reinforcement by using lower quantities of non-silane treated glass fibers compared to silane treated glass fibers. Further, the larger number of individual fibers available and the more homogeneous dispersion of these fibers can reduce the number of internal and external holes, voids, and defects in the composites, thereby improving the aesthetics of the polyurethane products.

It is desirable to provide polyurethane composites that are relatively lightweight, strong, and have high flexural strength for use in various applications, such as in exterior and interior building products. In some embodiments, the flexural strength of the polyurethane composites comprising non-silane treated glass fibers can be increased by at least 5%, for example, 10% or greater, 15% or greater, 20% or greater, 25% or greater, 30% or greater, 35% or greater, or 50% or greater, compared to identical polyurethane composites having the non-silane treated glass fibers replaced with silane treated glass fibers. The flexural strength of the composites described herein can be 200 psi or greater. For example, the flexural strength of the composites can be 250 psi or greater, 500 psi or greater, 750 psi or greater, 950 psi or greater, 1,000 psi or greater, 1,100 psi or greater, 1,200 psi or greater, 1,500 psi or greater, 2,000 psi or greater, 2,500 psi or greater, or 3,000 psi or greater. In some embodiments, the flexural strength of the polyurethane composites can be from 200 to 3,000 psi, from 1,000 to 2,500 psi, from 500 to 2,500 psi, or from 800 to 2,000 psi. The flexural strength can be determined by the load required to fracture a rectangular prism loaded in the three point bend test as described in ASTM C1185-08 (2012).

The polyurethane composites can exhibit a ratio of flexural strength (in psi) to density (in lb/ft$^3$) (normalized flexural strength) of from 15:1 to 60:1. In some embodiments, the polyurethane composites can exhibit a ratio of flexural strength (in psi) to density (in lb/ft$^3$) of from 15:1 to 50:1, 20:1 to 60:1, or from 30:1 to 60:1.

The polyurethane composites can exhibit a ratio of flexural strength (in psi) to the percentage of non-silane treated glass fibers by weight of from 300:1 to 6,000:1. In some embodiments, the polyurethane composites can exhibit a ratio of flexural strength (in psi) to the percentage of non-silane treated glass fibers by weight of from 500:1 to 3,000:1, 500:1 to 3,000:1, or from 500:1 to 1,000:1.

In some embodiments, the handleability of the polyurethane composites described herein can be increased by at least 10%, for example, 20% or greater, 30% or greater, 40% or greater, or even 50% or greater compared to a polyurethane composites without non-silane treated glass fibers. The handleability of the polyurethane composites can be 3 in lb/in or greater (e.g., from 3 in lb/in to 10 in lb/in or from 4.5 in lb/in to 10 in lb/in). The handleability can be determined by measuring the ability of the composite to be flexed during use and is calculated as 0.5×breaking load×ultimate deflection/thickness of the test specimen. The handleability of the composites can be determined using ASTM C1185-08.

Methods of preparing the polyurethane composites described herein are also disclosed. The composites can be produced using a batch, semi-batch, or continuous process. In some embodiments, the method can include forming a polyurethane mixture. The polyurethane mixture can be produced by mixing the one or more isocyanates, the one or more polyols, and the particulate filler in a mixing apparatus. The materials can be added in any suitable order. For example, in some embodiments, the mixing stage of the method used to prepare the polyurethane composite can include: (1) mixing the polyol, the particulate filler, and the non-silane treated glass fibers; (2) mixing the isocyanate with the polyol, the particulate filler, and the non-silane treated glass fibers; and optionally (3) mixing the catalyst with the isocyanate, the polyol, the particulate filler, and the non-silane treated glass fibers. In other embodiments, the glass fibers can be added prior to, during, or after stage (2) or (3).

It is desirable that the polyurethane mixture has a viscosity below a particular threshold at the desired loadings so it can be effectively processed. In some embodiments, the amount of non-silane treated glass fibers can be present in the composite mixture in amounts to produce a workable viscosity (initial viscosity) of from 5 Pa·s (5,000 cps) to 50 Pa·s (50,000 cps) at 20° C. For example, the fibers in the polyurethane mixture can be in amounts to produce an initial viscosity from 5 Pa·s to 40 Pa·s, 10 Pa·s to 50 Pa·s, or 10 Pa·s to 40 Pa·s. The viscosity of the composite mixture can be measured using a Brookfield Viscometer.

The polyurethane composite mixture can be blended in any suitable manner to obtain a homogeneous or heterogeneous blend of the one or more isocyanate, the one or more polyols, the particulate filler, the fibers including the non-silane treated glass fibers, and the optional catalyst. In some instances, lower shear is required to debundle the non-silane treated glass fibers compared to silane treated glass fibers. In some instances, the non-silane treated glass fibers do not require shear force to debundle the fibers. As a result, the use of non-silane treated fibers can reduce the cost of producing highly-filled polyurethane composites. In some embodiments, mixing can be conducted in a high speed mixer or in an extruder. An ultrasonic device can be used for enhanced mixing and/or wetting of the various components of the composite. The ultrasonic device produces an ultrasound of a certain frequency that can be varied during the mixing and/or extrusion process. The ultrasonic device useful in the preparation of composite panels described herein can be attached to or adjacent to the extruder and/or mixer. For example, the ultrasonic device can be attached to a die or nozzle or to the port of the extruder or mixer. An ultrasonic device may provide de-aeration of undesired gas bubbles and better mixing for the other components, such as blowing agents, surfactants, and catalysts.

The method of making the polyurethane composites can include allowing the one or more isocyanates and the one or more polyols to react in the presence of the particulate filler to form a polyurethane composite. The composite has a first surface and a second surface opposite the first surface. The curing stage of the method used to prepare the polyurethane composite can be carried out in a mold cavity of a mold, the mold cavity formed by at least an interior mold surface. The mold can be a continuous forming system such as a belt molding system or can include individual batch molds. The belt molding system can include a mold cavity formed at least in part by opposing surfaces of two opposed belts. In some embodiments, a molded article can then be formed prior to the additional method steps in forming the composites.

In some embodiments, the polyurethane mixture can be foamed. The polyols and the isocyanate can be allowed to produce a foamed composite material after mixing the components according to the methods described herein. In some embodiments, polyurethane foams can be formed by allowing the mixture to expand via a gas phase to form the foam. The gas phase can be generated in situ from reaction of water with the one or more isocyanates. The gas can be introduced into the polyurethane mixture. Suitable gases are known in the art. In some embodiments, the gas can be captured after gelation (i.e., formation) of the foam. The polyurethane composite can be formed while they are actively foaming or after they have foamed. For example, the polyurethane composite can be placed under the pressure of a mold cavity prior to or during the foaming of the polyurethane composite. In some cases, the mixture can be allowed to rise freely during foaming in the mold.

As discussed herein, incorporation of the non-silane treated glass fibers into the polyurethane composites can improve their physical and mechanical properties such as density, flexural strength, and handleability, compared to when the fibers are excluded from the polyurethane composites. The optimization of the physical and mechanical properties of the composites allow their use in interior and exterior building materials. For example, the polyurethane composites can be used in building materials such as siding materials, building panels, sheets, architectural moldings, sound barriers, thermal barriers, insulation, wall boards, ceiling tiles, ceiling boards, soffits, roofing materials, and other shaped articles. Examples of shaped articles made using the composite panels described herein include roof tiles such as roof tile shingles, roof cover boards, slate panels, shake panels, cast molded products, moldings, sills, stone, masonry, brick products, posts, signs, guard rails, retaining walls, park benches, tables, slats, corner arches, columns, ceiling tiles, or railroad ties.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the disclosure. Unless indicated otherwise, parts and percentages are on a weight basis, temperature is in ° C. or is at ambient temperature, and pressure is at or near atmospheric.

Mechanical Properties of Filled Polyurethane Composites with Various Combinations of Glass Fibers.

Preparation of Polyurethane Composite:

Polyurethane composites were prepared using various amounts of glass fibers. In Tables 1 and 2, the non-silane treated glass fibers are termed '8610' (a non-silane treated E-glass) and 'G' (a non-silane treated G-glass). The silane-treated glass fibers are E-glass fibers and termed '3075' and '3730'. The length of the glass fibers are also described in Tables 1 and 2, including ⅛ inch, ½ inch, and ¼ inch. The non-silane treated glass fibers included a starch-oil sizing agent.

The composites were prepared by mixing a polyol blend containing 6% by weight CARPOL® MX-470 and 94% by weight TEROL® 198 to produce a polyol mixture. The polyol mixture was then mixed with 1% by weight of an amine catalyst (diethanolamine) and 2% by weight of a silicone surfactant in a mixer. Fly ash and glass fibers (in the amounts described below) were added and wetted with the polyol mixture. Methylene diphenyl diisocyanate (MDI; 104 index; 51.5 g) was then added to the mixer with simultaneous stirring. The mixture was introduced into a confined mold and allowed to cure into a molded shape.

The properties of the composites, including flexural strength, density, handleability, and normallized flexural strength were determined on samples extracted from the molded product. The handleability is a measure of the ability of the material to be flexed during use and is calculated as 0.5×breaking load×ultimate deflection/thickness of the test specimen. The flexural strength is the load required to fracture a rectangular prism loaded in the three point bend test as described in ASTM $C_{1185}$-08. The normalized flexural strength is the ratio of flexural strength divided by the density.

TABLE 1

Mechanical properties of filled polyurethane composites comprising silane coated glass fibers ('3075' and '3730') and non-silane coated glass fibers ('8610 and 'G'). All the polyurethane mixtures contain 23% polyurethane by weight.

| Sample | Density, pcf | Flexural Strength, psi | Handleability, in*lb/in | Normalized Flexural Strength, psi/pcf |
|---|---|---|---|---|
| Control (No FG) | 43.0 | 937 | 3.1 | 21.8 |
| 0.2% ⅛" 3075 | 43.1 | 1085 | 3.6 | 25.2 |
| 0.6% ⅛" 3075 | 42.8 | 1161 | 4.0 | 27.1 |
| 1% ⅛" 3075 | 43.1 | 1285 | 4.9 | 29.8 |
| 2% ⅛" 3075 | 43.3 | 1524 | 6.4 | 35.2 |
| 3% ⅛" 3075 | 43.5 | 1715 | 8.5 | 39.4 |
| 4% ⅛" 3075 | 43.6 | 1845 | 8.5 | 42.3 |
| 0.2% ⅛" 3730 | 43.0 | 1237 | 4.7 | 28.7 |
| 0.6% ⅛" 3730 | 43.2 | 1200 | 4.3 | 27.8 |
| 1% ⅛" 3730 | 43.4 | 1343 | 5.1 | 31.0 |
| 2% ⅛" 3730 | 43.1 | 1620 | 6.8 | 37.6 |
| 3% ⅛" 3730 | 43.3 | 1751 | 7.9 | 40.4 |
| 4% ⅛" 3730 | 43.5 | 1865 | 9.1 | 42.9 |
| 0.2% ⅛" 8610 | 42.6 | 1170 | 4.3 | 27.4 |
| 0.6% ⅛" 8610 | 43.1 | 1315 | 5.2 | 30.5 |
| 1% ⅛" 8610 | 43.4 | 1353 | 5.5 | 31.2 |
| 0.6% ¼" 8610 | 43.2 | 1405 | 6.2 | 32.5 |
| 0.2% ½" 8610 | 43.6 | 1126 | 4.0 | 25.8 |
| 0.6% ½" 8610 | 43.1 | 1279 | 5.2 | 29.7 |
| 0.2% ⅛" G | 43.3 | 1140 | 4.1 | 26.3 |
| 0.6% ⅛" G | 43.2 | 1256 | 4.9 | 29.1 |
| 1% ⅛"G | 44.3 | 1358 | 5.5 | 30.6 |
| 2% ⅛" G-1 | 43.9 | 1726 | 8.7 | 39.4 |
| 2% ⅛" G-2 | 47.7 | 2003 | 6.2 | 42.0 |
| 4% ⅛" G | 43.6 | 1920 | 10.0 | 44.1 |

TABLE 2

Percent increase in flexural strength of filled polyurethane composites comprising non-silane coated glass fibers ('8610 and 'G') versus silane coated glass fibers ('3075' and '3730').

| Comparison of flexural strength of product with described fiber of particular length | ⅛" length 8610 fiber | ¼" length 8610 fiber | ½" length 8610 fiber | ⅛" length G fiber |
|---|---|---|---|---|
| Compared to ⅛" 3075 @ 0.6% use | 13.2% | 21.0% | 10.1% | 8.2% |
| Compared to ⅛" 3730 @ 0.6% use | 9.6% | 17.1% | 6.6% | 4.7% |
| Compared to ⅛" 3075 @ 2% use | N/A | N/A | N/A | 13.3% |
| Compared to ⅛" 3730 @ 2% use | N/A | N/A | N/A | 6.6% |
| Compared to ⅛" 3075 @ 4% use | N/A | N/A | N/A | 4.1% |
| Compared to ⅛" 3730 @ 4% use | N/A | N/A | N/A | 2.9% |

Summary:

As shown in Tables 1 and 2 and FIG. 1, the filled polyurethane composites comprising non-silane treated glass fibers ('8610' and 'G') exhibited a 3%-21% higher flexural strength than composites comprising the same level of silane-treated glass fiber ('3075' and '3730'). The differences in flexural strength is believed to be due to the ease with which the non-silane treated glass fibers can disperse and debundle in the filled polyurethane composites, so that a larger number of individual fibers are present in the composite matrix, compared to silane treated glass fibers. Further, dispersion and debundling of the glass fibers lead to a more uniform and homogeneous dispersion of the glass fibers in the final product. The larger number of individual glass fibers available and the more homogeneous dispersion of these fibers can improve their reinforcing efficiency. Thus, the non-silane treated glass fibers can achieve the same level of reinforcement in lower quantities than silane treated glass fibers. Further, lower shear is required to debundle non-silane treated glass fibers compared to silane treated glass fiber, thereby reducing the cost for producing filled polyurethane composites.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise.

What is claimed is:

1. A filled polyurethane composite, comprising:
   (a) a polyurethane;
   (b) from greater than 50% to 90% by weight, based on the total weight of the composite, of a filler; and
   (c) from 0.1% to 20% by weight, based on the total weight of the composite, of glass fibers, wherein the glass fibers are E-glass fibers,
   wherein at least a portion of the glass fibers do not comprise a silane sizing agent.

2. The composite of claim 1, wherein the glass fibers have an average length of from 1.5 mm to 33 mm.

3. The composite of claim 1, wherein the glass fibers are coated with a non-silane sizing agent, and the non-silane agent includes a starch and an oil.

4. The composite of claim 1, wherein the filler comprises fly ash.

5. The composite of claim 4, wherein the fly ash is present in an amount of from 50% to 80% by weight, based on the total weight of the composite.

6. The composite of claim 1, wherein the composite has a flexural strength of 200 psi or greater, as measured by ASTM C1185.

7. The composite of claim 1, wherein the composite has a flexural strength that is 5% or greater than the flexural strength of an identical composition wherein the glass fibers are replaced with silane-treated glass fibers.

8. The composite of claim 1, wherein the composite has a ratio of flexural strength in psi to density in pcf (normalized flexural strength) from 15 to 60.

9. A building material comprising the composite of claim 1, wherein the building material is selected from siding, carpet backing, building panels, sheets, architectural moldings, sound barriers, thermal barriers, insulation, wall boards, ceiling tiles, ceiling boards, soffits, or roofing materials.

10. A filled polyurethane composite, comprising:
    (a) a polyurethane;
    (b) from greater than 50% to 90% by weight, based on the total weight of the composite, of a filler; and
    (c) from 0.1% to 20% by weight, based on the total weight of the composite, of glass fibers,
    wherein the glass fibers are coated with a non-silane sizing agent that comprises a starch and an oil.

11. The composite of claim 10, wherein the glass fibers have an average length of from 1.5 mm to 33 mm.

12. The composite of claim 10, wherein the filler comprises fly ash.

13. The composite of claim 10, wherein the composite has a flexural strength of 200 psi or greater, as measured by ASTM C1185.

14. The composite of claim 13, wherein the fly ash is present in an amount of from 50% to 80% by weight, based on the total weight of the composite.

15. The composite of claim 10, wherein the composite has a flexural strength that is 5% or greater than the flexural strength of an identical composition wherein the glass fibers are replaced with silane-treated glass fibers.

16. The composite of claim 10, wherein the composite has a ratio of flexural strength in psi to density in pcf (normalized flexural strength) from 15 to 60.

* * * * *